Nov. 16, 1965  D. A. FLUEGEL  3,218,445
SIGNAL MULTIPLIER WHERE ONE SIGNAL TO BE MULTIPLIED
CAUSES A MEMBER TO DEFORM
Filed Jan. 29, 1962  2 Sheets-Sheet 1

INVENTOR.
D. A. FLUEGEL
BY Young & Quigg
ATTORNEYS

Nov. 16, 1965    D. A. FLUEGEL    3,218,445
SIGNAL MULTIPLIER WHERE ONE SIGNAL TO BE MULTIPLIED
CAUSES A MEMBER TO DEFORM
Filed Jan. 29, 1962    2 Sheets-Sheet 2
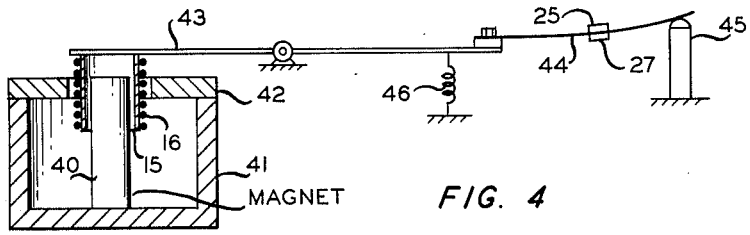
FIG. 4
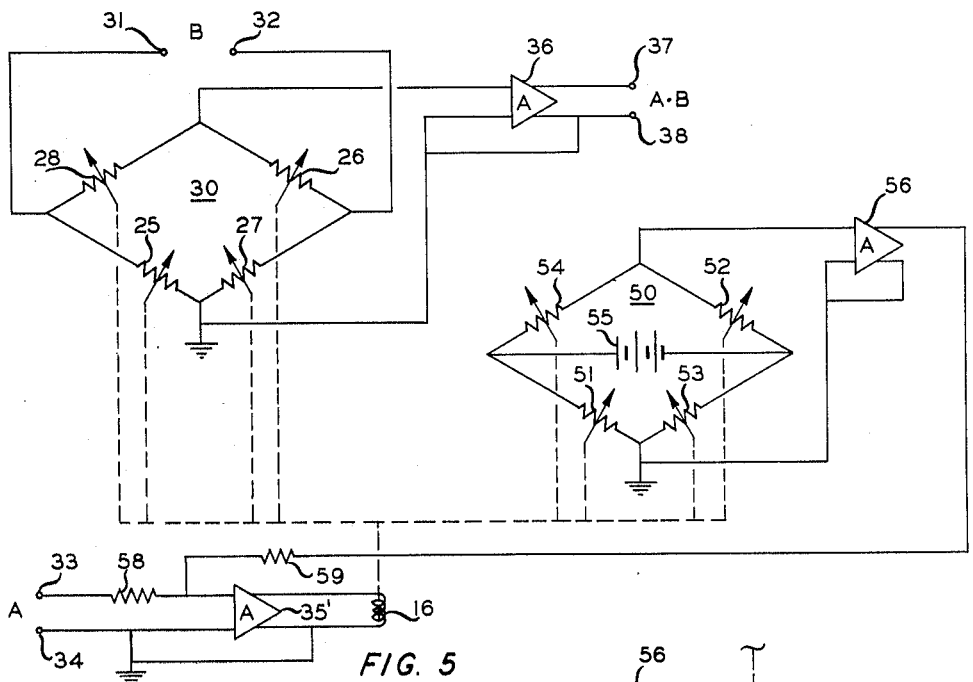
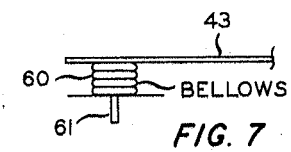
FIG. 5
FIG. 7
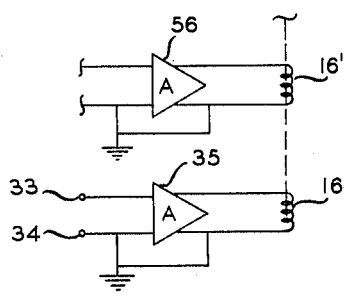
FIG. 6
INVENTOR.
D. A. FLUEGEL.
BY Young + Quigg
ATTORNEYS United States Patent Office 3,218,445
Patented Nov. 16, 1965

3,218,445
SIGNAL MULTIPLIER WHERE ONE SIGNAL TO BE MULTIPLIED CAUSES A MEMBER TO DEFORM
Dale A. Fluegel, Bartlesville, Okla., assignor to Phillips Petroleum Company, a corporation of Delaware
Filed Jan. 29, 1962, Ser. No. 169,352
5 Claims. (Cl. 235—194)

This invention relates to the multiplication of a first signal by a second.

Various types of analog computers have been developed in recent years for use in the analysis and control of processes and systems. In many of these computers, it is necessary to multiply one signal by another. This can be somewhat of a problem when the two signals are electrical and variable. Most of the electronic multipliers known in the art are complex and are plagued with a zero drift. Servo multipliers, on the other hand, are limited in their speed of response by the inertia of the balancing servo motor.

In accordance with the present invention, a simplified multiplier is provided which is capable of multiplying a first signal by a second when at least one of the signals is electrical. This multiplier utilizes at least one strain gauge which is mounted on a deformable member. The member is deformed in accordance with the first signal to be multiplied to change the impedance of the strain gauge. The strain gauge is connected in one arm of a bridge network. The second signal to be multiplied is applied as an electrical signal across the bridge network to energize same. In this manner, an output signal is obtained from the bridge network which is representative of the product of the two input signals.

Accordingly, it is the primary object of this invention to provide improved apparatus for multiplying signals.

Other objects, advantages and features of the invention should become apparent from the following detailed description, taken in conjunction with the accompanying drawing in which:

FIGURE 4 is a schematic view, shown partially in section, of a second embodiment of the mechanical components of the multiplier.

FIGURE 5 is a schematic circuit drawing of a second embodiment of the electrical components of the multiplier of this invention.

FIGURE 6 is a schematic circuit drawing of a modification of a part of the circuit of FIGURE 5.

FIGURE 7 illustrates a modification of the apparatus of FIGURE 4 wherein one of the signals to be multiplied is a pneumatic pressure.

Figure 1:
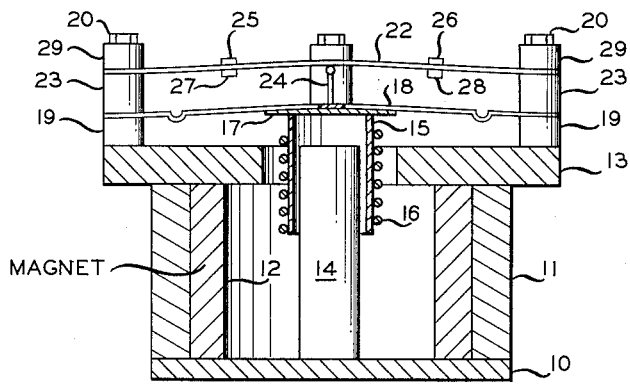
FIGURE 1 is a view, shown partially in section, of a first embodiment of the mechanical components of the multiplier of this invention.
Figure 2:
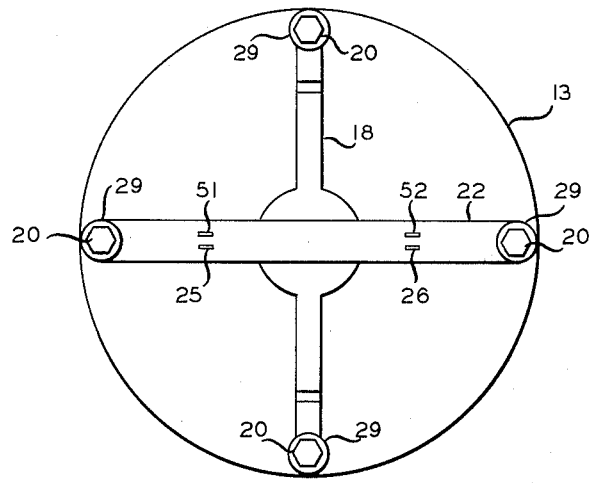
FIGURE 2 is a top view of the apparatus of FIGURE 1.

Referring now to the drawing in detail and to FIGURES 1 and 2 in particular, there is shown a base 10 which supports a cylindrical housing 11. A cylindrical magnet 12 is positioned within housing 11. An annular plate 13 is positioned across the top of housing 11 and magnet 12. A cylinder 14 is positioned centrally within magnet 12 such that an annular air gap is formed between the top of cylinder 14 and plate 13. Elements 10, 11, 13 and 14 are formed of magnetic material such that a magnetic field is concentrated in the air gap between plate 13 and cylinder 14. A hollow cylinder 15, which supports a coil 16, is suspended within this air gap. The upper end of cylinder 15 is attached to a disk 17 which in turn is secured to a spider 18. Spider 18 is supported at its outer edges by a plurality of sleeves 19 that are secured to plate 13.

A flat spring 22 is supported at its outer ends by sleeves 23 so that the center portion of the spring is spaced above disk 17. Sleeves 29 rest on top of the ends of spring 22. The three groups of sleeves are secured to plate 13 by respective screws 20. A rod 24 extends upwardly from disk 17 and engages this center portion of spring 22. Strain gauges 25 and 26 are mounted on the upper side of spring 22. Additional strain gauges 27 and 28 are mounted on the lower side of spring 22. As described hereinafter in detail, a current is supplied to coil 16 which is representative of one of the signals to be multiplied. This current tends to cause coil 16 to move to the center of the magnetic field across the air gap, which results in disk 17 being moved upwardly. Rod 24 tends to move the center of spring 22 upwardly to deform the spring. This places the strain gauges under stresses which vary the impedances thereof. The ends of spring 22 can be provided with elongated holes which receive screws 20 to permit this movement of spring 22. Actually, very small displacements are required.

Figure 3:
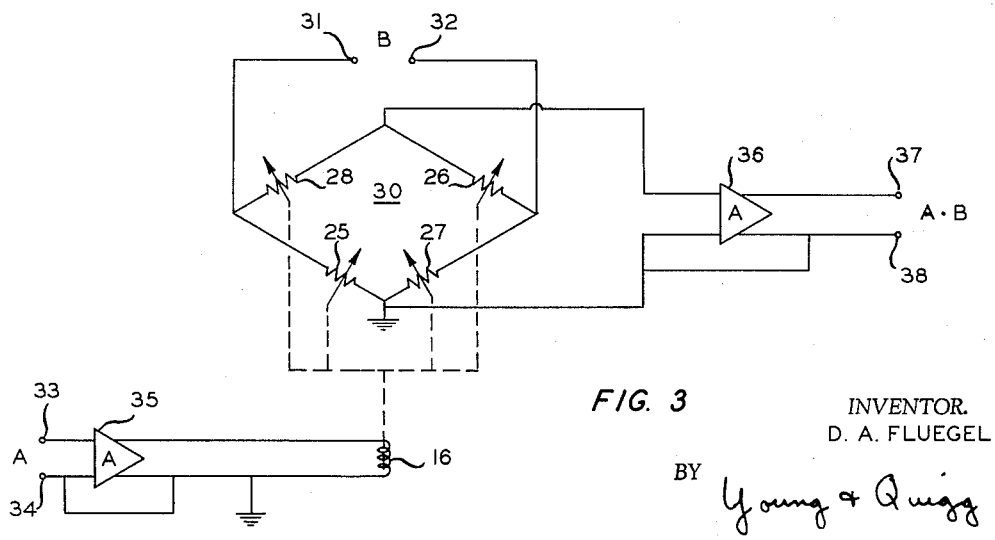
FIGURE 3 is a schematic circuit drawing of a first embodiment of the electrical components of the multiplier of this invention.

As illustrated in FIGURE 3, the four strain gauges are connected to form a Wheatstone bridge 30. The junction between strain gauges 25 and 28 is connected to a first input terminal 31. The junction between strain gauges 26 and 27 is connected to a second input terminal 32. A first input signal A which is to be multiplied is applied between input terminals 33 and 34 of an amplifier 35. The output signal of amplifier 35 is applied across coil 16. In this manner, the resistances of the strain gauges in bridge network 30 are varied in response to the amplitude of the input signal A which deforms spring 22 by movement of coil 16. The second input signal B is applied between terminals 31 and 32. The junction between strain gauges 26 and 28 is connected to the first input terminal of output amplifier 36. The junction between strain gauges 25 and 27 is connected to the second input terminal of amplifier 36. The output terminals of amplifier 36 are connected to respective output terminals 37 and 38. The signal which appears between these terminals is representative of the product $A \times B$.

The strain gauges utilized in accordance with this invention can be conventional wire strain gauges wherein the resistances of the wires are functions of the strains applied thereto. When these wires are connected in the manner illustrated in FIGURE 1, the gauges on one side of the spring increase in resistance when the spring is deformed while the gauges on the other side of the spring decrease in resistance. Since the gauges on the same side of the spring are connected in opposite arms of the bridge network, the resulting unbalance of the bridge is a maximum. Alternatively, the strain gauges can be semi-conductor elements of the type described in Bulletin K–102 of Kulite-Bytrex Corporation, 50 Hunt Street, Newton 58, Massachusetts. These semi-conductor strain gauges are much more sensitive than conventional wire gauges, but generally more expensive. In addition, semi-conductor strain gauges of this type are available which change in resistance in either a positive or negative manner with an applied strain of a given direction. If these positive and negative gauges are employed, they are all mounted on the same side of spring 22. In this case, gauges 25 and 26 change resistance in one way with an applied strain, whereas gauges 27 and 28 change resistance in the opposite manner. All of the gauges employed should be positioned symmetrically about the center point of spring 22 in order to provide a linear output signal. If the strain gauges are sufficiently small, they should all be mounted at the same location on the spring to assure that they all receive the same strain.

As illustrated in FIGURE 3, four separate active strain gauges are employed in the multiplying circuit. This gives a maximum output signal and permits temperature compensation at the same time. While this is the most desirable arrangement with four gauges, a multiplier can be formed with fewer strain gauge elements. For example, elements 25 and 27 can be strain gauges, whereas elements 26 and 28 can be merely compensating resistors in the bridge network. In addition, the bridge network can be simplified even further by employing only a single strain gauge, such as 25. However, the output signal is not linear under these circumstances unless spring 22 is designed in such a manner that a non-linear strain is imposed on element 25 by movement of coil 16.

A second embodiment of the mechanical components of the multiplier of this invention is illustrated in FIGURE 4. A cylindrical magnet 40 is positioned within a cup-shaped housing 41. An annular plate 42 is attached to the top of housing 41 such that an air gap is formed between the top of magnet 40 and plate 42. Cylinder 15 is attached to the end of a bar 43 which is pivotally supported, preferably at or near its center point. The first end of a spring 44 is secured to the second end of bar 43. The second end of spring 44 rests on a stationary support 45. A spring 46 normally pulls the second end of bar 43 downwardly such that spring 44 initially is placed under tension. Although not illustrated, support 45 can be adjustable in a vertical direction to vary the initial strain on spring 44. The various strain gauges employed, such as 25 and 27, are mounted on spring 44. When current is supplied to coil 16, bar 43 is rotated about its pivot point to change the force exerted on the strain gauges. It should be evident that the additional strain gauges 26 and 28 of FIGURE 3 can be attached to spring 44 at the same general locations as gauges 25 and 27, respectively.

A second embodiment of the electrical circuit of this invention is illustrated schematically in FIGURE 5. Bridge network 30 is identical to the circuit shown in FIGURE 3. However, the circuit of FIGURE 5 employs a second Wheatstone bridge network 50 which has strain gauges 51, 52, 53 and 54 contained therein. These additional strain gauges are mounted at substantially the same locations that respective strain gauges 25, 26, 27 and 28 occupy on the spring 22 (see FIGURE 2) or on spring 43. In this manner, the resistances of the strain gauges in bridge network 50 change in the same manner as do the resistances of the corresponding strain gauges in bridge network 30. A voltage source 55 is connected across first opposite terminals of bridge network 50. The second opposite terminals of network 50 are connected to the respective input terminals of an amplifier 56.

Input terminal 33 is connected through a resistor 58 to the first input terminal of amplifier 35′. The output of amplifier 56 is applied to the input of amplifier 35′ through a resistor 59. Amplifier 35′ thus forms a summing amplifier wherein the signal from amplifier 56 is applied as negative feedback so as to be subtracted from signal A. This negative feedback results in an output signal from amplifier 36 which is more linear with respect to changes in the input signals.

Instead of employing a summing amplifier 35′, the output signal from amplifier 56 can be applied directly to a second coil 16′, see FIGURE 6, which is mounted adjacent coil 16 on cylinder 15. Coil 16′ and amplifier 56 are connected such that coil 16′ effectively opposes the action of coil 16. This also results in a negative feedback signal.

As previously mentioned, it is not necessary that both of the signals to be multiplied are electrical. If one of the signals is pneumatic, for example, this signal can be employed directly to deform one of the springs. An arrangement of this type is illustrated schematically in FIGURE 7 wherein a bellows 60 is fixed at one end and connected to bar 43 at the other end. A conduit 61 communicates with the interior of bellows 60 to supply a pneumatic input signal A which is to be multiplied by a second electrical signal B. Changes in pressure of the pneumatic signal A expand or contract bellows 60 to pivot bar 43 about its center point. This changes the resistances of the strain gauges in the same manner as does the application of current to coil 16.

In view of the foregoing description, it should be evident that a simple, inexpensive signal multiplier is provided in accordance with this invention which utilizes strain gauges that are varied in accordance with one of the signals to be multiplied. The second signal to be multiplied is applied across a bridge network containing the strain gauges in such a manner that the output signal is representative of the product of the two input signals.

The gains of the various amplifiers employed in the circuits of this invention can be adjusted to calibrate the circuits initially so that the output signals are directly proportional to the products of the input signals. The springs normally are deformed by only small amounts so that the strains imparted to the gauges are linear functions of the corresponding input signals.

While the invention has been described in conjunction with presently preferred embodiments, it should be evident that it is not limited thereto.

What is claimed is:

1. Apparatus for multiplying a first signal by a second electrical signal comprising a deformable member; means actuated by said first signal to deform said member by an amount representative of said first signal; first and second strain gauges attached to said member so that the electrical impedance of one is increased and the electrical impedance of the other is decreased when said member is deformed; a first electrical bridge network having said first and second strain gauges connected therein so that the output signal from said first bridge network varies as a function of changes in impedance of said first and second strain gauges in response to said member being deformed; means to apply said second signal across said first bridge network to energize same; third and fourth strain gauges attached to said member so that the electrical impedance of one is increased and the electrical impedance of the other is decreased when said member is deformed; a second electrical bridge network having said third and fourth strain gauges connected therein so that the output signal from said second bridge network varies as a function of changes in impedance of said third and fourth strain gauges; means to apply a reference voltage across said second bridge network to energize same; and means to substract a signal representative of the output signal from said second bridge network from said first signal to decrease the amount said member is deformed.

2. The apparatus of claim 1 wherein said first signal is an electrical signal; and said means to deform said member comprises a coil, means responsive to said coil being energized to deform said member, means to subtract the output signal of said second bridge network from said first signal, and means responsive to the difference between said first signal and the output signal of said second bridge network to energize said coil.

3. The apparatus of claim 1 wherein said first signal is an electrical signal; and said means to subtract and to deform comprise first and second coils positioned to establish magnetic fields opposing one another when said coils are energized, the net resulting magnetic field deforming said member, means to apply said first signal to said first coil, and means to apply the output signal from said second bridge network to said second coil.

4. Apparatus for multiplying a first electrical signal by a second electrical signal comprising a deformable member; means actuated by said first signal to deform said member by an amount representative of said first signal comprising means establishing a magnetic field, a coil positioned for movement within said magnetic field, said coil being adapted to have said first signal applied thereto, and means connecting said coil to said member so that movement of said coil in said field responsive to current therethrough deforms said member; first and second strain gauges attached to said member so that the electrical impedance of one is increased and the electrical impedance of the other is decreased when said member is deformed; an electrical bridge network having said strain gauges connected therein so that the output signal from said bridge network varies as a function of changes in impedance of said gauges in response to said member being deformed; and means to apply said second signal across said bridge network to energize same.

5. The apparatus of claim 4 wherein said bridge network comprises a Wheatstone bridge having said strain gauges in adjacent first and second arms thereof, said second signal is applied across first opposite terminals of said bridge, and said output signal appears across second opposite terminals of said bridge.

References Cited by the Examiner
UNITED STATES PATENTS

| | | | |
|---|---|---|---|
| 2,478,720 | 8/1949 | Sourwine et al. | |
| 2,500,360 | 3/1950 | Jones | 73—410 |
| 2,559,718 | 7/1951 | Goodlett et al. | 235—179 X |
| 2,771,579 | 11/1956 | Ruge | 73—88.5 X |
| 2,831,990 | 4/1958 | Young | 310—14 |
| 2,921,739 | 1/1960 | Tolles | 235—194 |
| 2,924,967 | 2/1960 | Gieseler | 73—88.5 |
| 2,952,807 | 9/1960 | Heller | 73—88.5 X |
| 3,017,110 | 1/1962 | Corder | 235—194 |

MALCOLM A. MORRISON, *Primary Examiner.*